United States Patent
Blot-Carretero et al.

(10) Patent No.: US 6,655,123 B2
(45) Date of Patent: Dec. 2, 2003

(54) DEVICE FOR ECONOMIZING FUEL SUPPLY IN A FUEL SUPPLY CIRCUIT

(75) Inventors: Marie-Trinité Rose Blot-Carretero, Maincy (FR); Philippe Galozio, Lieusaint (FR); Jean-Marie Brocard, Rubelles (FR); Claude Marcel Maillard, Vulaines sur Seine (FR)

(73) Assignee: SNECMA Moteurs, Paris (FR)

( * ) Notice: Subject to any disclaimer, the term of this patent is extended or adjusted under 35 U.S.C. 154(b) by 79 days.

(21) Appl. No.: 09/983,623

(22) Filed: Oct. 25, 2001

(65) Prior Publication Data

US 2002/0050140 A1 May 2, 2002

(30) Foreign Application Priority Data

Oct. 26, 2000 (FR) .............................. 00 13713

(51) Int. Cl.$^7$ ................................. F02C 9/28
(52) U.S. Cl. .................................... 60/39.281
(58) Field of Search .............................. 60/39.281, 734

(56) References Cited

U.S. PATENT DOCUMENTS

| | | | |
|---|---|---|---|
| 2,916,875 A | | 12/1959 | Morley et al. |
| 4,760,696 A | * | 8/1988 | Rooks et al. ............ 60/39.281 |
| 4,817,376 A | | 4/1989 | Brocard et al. |
| 5,020,315 A | * | 6/1991 | Leachman et al. ....... 60/39.281 |
| 5,404,709 A | | 4/1995 | Mac Lean et al. |
| 5,832,717 A | * | 11/1998 | Halin ..................... 60/39.281 |

FOREIGN PATENT DOCUMENTS

| | | |
|---|---|---|
| EP | 0 388 046 | 9/1990 |
| EP | 0 399 692 | 11/1990 |
| FR | 1.541.486 | 10/1968 |
| GB | 2 300 451 A | 11/1996 |

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

An aircraft engine fuel supply circuit includes a high pressure pump for supplying the engine fuel injectors and supplying a plurality of servovalves for operating various auxiliary mechanisms. In an in-flight re-ignition configuration, with the rotational speed of the engine drops below a threshold value, a fuel economizer valve receives a command to close, thereby shutting off the supply of high pressure fuel to the servovalves. Consequently, the dimensions of the high pressure pump and other associated components in the circuit, especially heat exchangers, may be reduced.

10 Claims, 1 Drawing Sheet

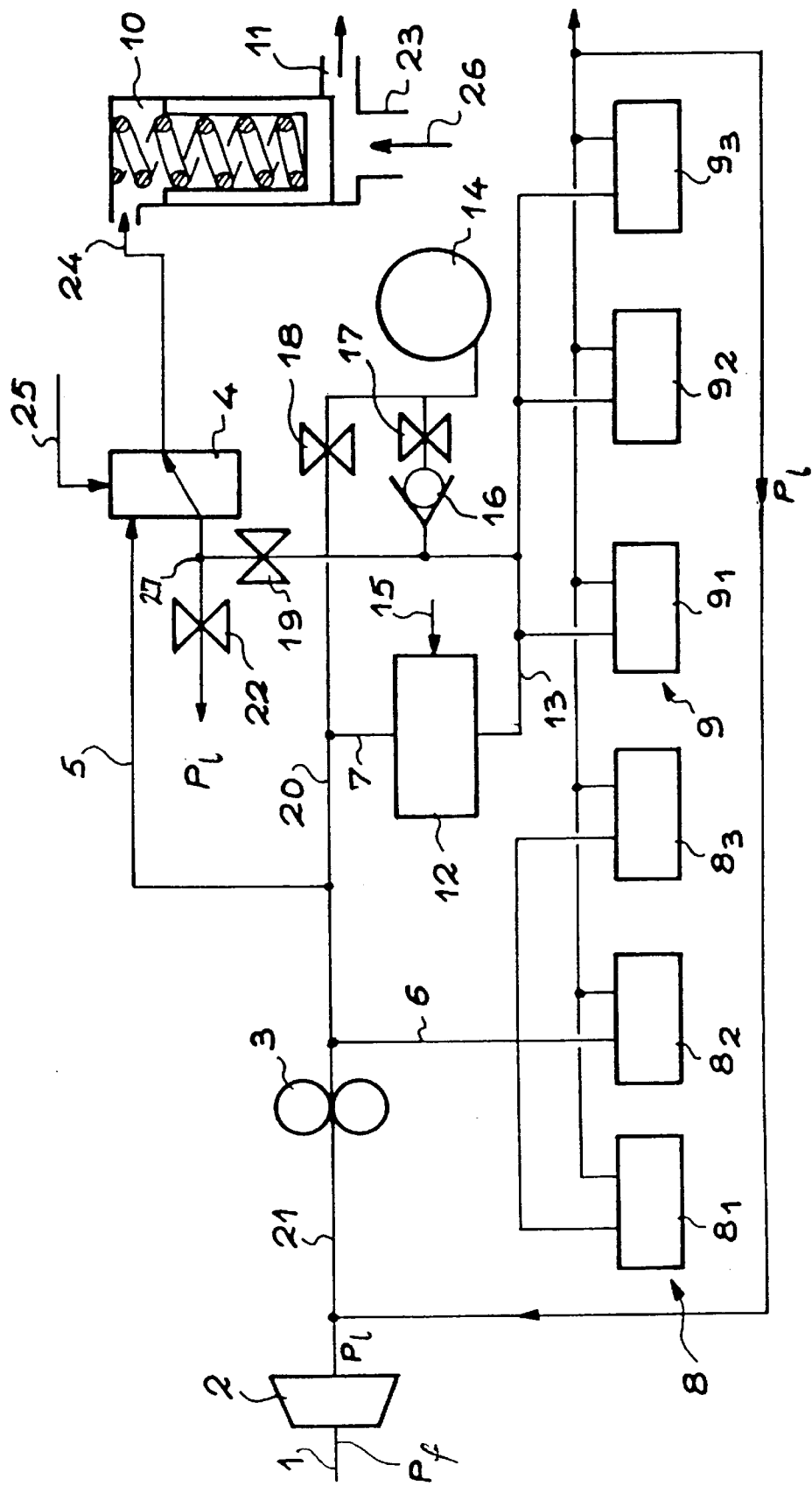

DEVICE FOR ECONOMIZING FUEL SUPPLY IN A FUEL SUPPLY CIRCUIT

BACKGROUND OF THE INVENTION

1. Field of the Invention

The invention relates generally to aeroengine fuel circuits. It relates more specifically to a device for reducing the fuel delivery needed at the outlet of a high pressure pump of a circuit when the engine speed is below a predetermined threshold, for example in an in-flight re-ignition configuration. The invention also relates to a method for reducing the delivery of fuel used, at a given engine speed or under given flight conditions.

2. Technological Background

In an aeroengine, fuel is supplied to fuel injectors, at which the fuel is burnt, to provide the energy for propulsion and for engine auxiliaries. The fuel is also used as a coolant in heat exchangers, and to operate a plurality of hydraulic servovalves. For example, jet pipes and other variable-geometry members are operated by hydraulic rams which are driven by a supply of the fuel under pressure.

The servovalves are normally supplied from a central servovalve feed unit whose pressure must remain constant and whose delivery must be capable of being varied in accordance with servovalve requirements.

The circuit supplying the injectors, the exchangers and the central servovalve feed unit comprises a low pressure pump which raises fuel coming from the aircraft tanks at an initial pressure $P_f$ to a pressure $P_I$, and a high pressure pump which further raises the fuel to a pressure higher than the pressure needed by the fuel injectors and by the central servovalve feed unit.

Unused fuel is recycled. It is well known that the proportion of fuel recycled compared to the fuel used must not be excessive, since the fuel is heated by its passage through the high pressure pump and is therefore less suitable as a cooling liquid. The high pressure pump may be a pump whose delivery is determined solely by its rotational speed. This speed is itself a function of the engine speed. The pump may also be a pump whose delivery is a function not only of its rotational speed, but also of another parameter which can be so controlled that a pump running at a given speed can provide different delivery rates.

The dimensions of the high pressure pump are calculated so that the pump can provide the necessary delivery regardless of the engine speed. It has been found that the conditions which are the most unfavorable, relative to the dimensions of the pump, are the conditions at the moment of in-flight re-ignition.

During re-ignition in-flight, the fuel supply needed by the engine fuel injectors is obviously low, but the other requirements of the engine, particularly those of the variable geometry members, remain more or less constant.

As a result, the high pressure pump is dimensioned to satisfy conditions which are encountered only very exceptionally during the life of an engine. It then follows that, in order to counter a rare eventuality, the high pressure pump is oversized for practically all other flight conditions.

This means that the high pressure pump is heavy compared with the delivery that is required most of the time. It also means that there is significant recycling of unused fuel, that is to say return of a significant fraction of the fuel to the low pressure side of the pump through a regulating (bypass) valve, whereby the unused fuel is heated up by the rise in pressure it has experienced. As a result, the hotter fuel is less able to perform its cooling function, and the heat exchangers need to be sized to take this into account.

Thus, the pump, the heat exchanger and, for delivery supply reasons, other parts of the fuel circuit, are oversized in order to meet requirements in highly exceptional flight conditions, namely in-flight re-ignition.

SUMMARY OF THE INVENTION

By comparison with the state of the art just described, the object of the invention is to reduce the size of the high pressure pump, and therefore the delivery provided by the pump under all flight speed conditions. This results in a reduction in the size of associated parts of the fuel circuit and, in particular, in the size of the heat exchangers, whose coolant is the fuel. On the whole, the mass and therefore the cost of a circuit comprising the invention, are reduced.

According to the invention, in a fuel supply circuit of an aircraft engine including fuel injectors and a plurality of servovalves, a low pressure pump for raising the pressure of fuel from a tank from a pressure $P_f$ to a pressure $P_I$, and a high pressure pump for further raising the pressure of the fuel to a relatively high pressure, the high pressure fuel supplying said plurality of servovalves, and supplying said fuel injectors through a pressure regulator, there is provided a device connected downstream of said high pressure pump and upstream of said plurality of servovalves for controlling the supply of fuel from said high pressure pump to said plurality of servovalves, said device having an open position in which said high pressure pump is in communication with said plurality of servovalves and a closed position in which said plurality of servovalves is not supplied by said high pressure pump, said device receiving a command to move to said closed position in response to the pressure of said fuel dropping below a predetermined value or in response to the rotational speed of said engine dropping below a predetermined value.

Cutting the fuel supply to at least some of the servovalves, and therefore some of the variable geometry members, in particular those which it is known will not be used during a phase of re-ignition of the engine in-flight, reduces the fuel delivery needed.

Thus, the delivery available is directed as a matter of priority to the fuel injectors. The high pressure pump may therefore be dimensioned for a lower delivery, thus reducing the mass and the volume of the pump. Since the pump is of a smaller size, the delivery is also lower, and the volume of fuel that has been heated up by the rise in pressure and is recycled is thus reduced. As a result, the fuel used as coolant in the heat exchangers is colder, and the volume of said exchangers can be reduced.

Thus, despite the addition of the device for controlling the supply of fuel to the servovalves, the overall mass and the volume of the fuel circuit are reduced.

In a preferred embodiment making it possible to further reduce the size of the high pressure pump, for engine speeds below the threshold rotational speed, the fuel injector supply pressure is reduced. Thus, the pressure of the fuel delivered by the high pressure pump is also lower and, in consequence, the delivery of this pump, for the same rotational speed, is higher.

In general, the fuel injector supply pressure is regulated by a pressurizing valve. This valve has an opening for the outlet of fuel toward the fuel injectors. The cross section of this outlet opening is a function of the position of a spool. The axial position of the spool within the pressurizing valve is a function of the forces exerted on the spool in the two opposite directions along the valve axis. One or more springs exert a force on the spool in one axial direction, and the fuel pressure received on one or more pistons of the spool exerts a force in the opposite axial direction.

In general, the law governing the movement of the spool, and therefore the law governing the variation of the cross section of the outlet opening of the valve, is such that the pressure of the fuel increases with the delivery consumed by the fuel injectors.

According to a preferred embodiment of the invention, said pressure regulator operates according to a first or a second pressurization law, said second law being used when the engine speed is below a predetermined value, the pressure of fuel delivered to said fuel injectors as a result of said second law being lower than the pressure which would have resulted from said first law for the same rotational speed of the engine.

One means of producing this modified pressurization law is to change the nature of a fuel pressure applied to a piston of the spool.

According to an alternative embodiment of the invention, when the engine speed drops below the threshold value, the supply of high pressure fuel to the bearings of the high pressure pump can be reduced, possibly to the point of cutting it off altogether. When the high pressure is cut off, the bearing 14 receives only the low pressure $P_l$.

Since the rotational speed of the high pressure pump is low at low engine speeds, it is sufficient for the fuel supply to the pump bearings to be at low pressure, or at a reduced high pressure delivery. It should also be noted that the durations of use corresponding to in-flight re-ignition are very short, which means that the risk of damaging the bearings is practically zero.

BRIEF DESCRIPTION OF THE DRAWINGS

The FIGURE schematically depicts a fuel supply circuit incorporating a fuel delivery economizing valve.

DESCRIPTION OF EMBODIMENTS OF THE INVENTION

The FIGURE depicts very schematically a fuel supply circuit incorporating two embodiments of the invention and including an alternative form relating to the supply of fuel to the high pressure pump bearings.

It is first of all emphasized that the fuel supply circuit has been simplified in the extreme so as to show only those elements which are needed in order to understand the invention. Intermediate elements such as heat exchangers, short circuits (by-passes) and filters, in particular a self-cleaning filter for supplying filtered high pressure fuel to the servovalves that operate the engine mechanisms, referred to above as "variable geometry members" have been omitted. All the omitted elements and their functional locations are known to those skilled in the art.

The fuel arrives from an aircraft fuel tank via a pipe 1 at a pressure $P_f$. It is pressurized by a low pressure feed pump 2 which delivers fuel at a pressure $P_l$.

The fuel leaving this pump 2, together with fuel from a return loop, which will be discussed later on, are delivered via a pipe 21 to a high pressure pump 3, whose output is adjustable according to the speed of rotation of the engine.

The fuel from the outlet of the high pressure pump 3 is directed through a pipe 5 to a stop cock 4 and from there to a pressurizing valve 10 including an inlet 24 and an outlet 11 that is directed towards the engine fuel injectors. It will be noted, although this is not directly involved in the invention, that the stop cock 4 directs the high pressure fuel from, for example, the pipe 5 to the inlet 24 of the pressurizing valve 10 if a stop command, represented by the arrow 25, is received. If it is received, then a spool of the valve 10 moves to completely obstruct the outlet 11 of the valve 10, whereby the fuel injectors no longer receive any fuel.

The pressurized fuel leaving the pump 3 is also directed, by a pipe 6, toward a first series of variable geometry members 8. The FIGURE depicts three of these bearing the references $8_1$, $8_2$ and $8_3$.

The fuel leaving the pump 3 is also directed via a pipe 7 toward a fuel delivery economizing valve 12. One outlet 13 of this valve supplies a second series of variable geometry members 9. The FIGURE depicts three of these bearing the references $9_1$, $9_2$ and $9_3$.

In the embodiment depicted in the FIGURE, the pressurized fuel leaving the high pressure pump 3 supplies bearings 14 of the high pressure pump 3 via an orifice plate 18. The bearings 14 of the high pressure pump 3 are also coupled to the outlet 13 of the valve 12 via a nonreturn valve 16 and another orifice plate 17. In the FIGURE, the bearings 14 have been represented separately from the pump 3, because FIG. 1 is a functional diagram. It should, however, be understood that, physically, the bearings 14 are housed in the pump 3.

This circuit works in the following way.

When the rotational speed of the engine drops below a threshold value, and a command for controlling an aircraft equipped with the engine is set to in-flight re-ignition, the controllable valve 12 receives a command 15 to close, whereby the second series of variable geometry members 9 is no longer supplied with high pressure fuel.

Thus, the fuel consumed is lower and a greater proportion of the delivery supplied by the high pressure pump 3 is directed toward the engine fuel injectors.

In the embodiment depicted in the FIGURE, as indicated above, the high pressure fuel supply to the bearings 14 of the high pressure pump 3 is reduced by the use of means consisting, for example, of orifice plates 17, 18, of which one, 17, is coupled to the valve 12 downstream thereof, and to the bearing 14 upstream thereof.

In a normal mode of operation of the engine, that is to say when the engine is running at above the threshold speed, for example between low idle and full throttle, the bearing 14 is supplied on the one hand through the orifice plate 18 inserted between a first high pressure inlet, for example as depicted in the FIGURE, a pipe 20, and on the other hand through the orifice plate 17 inserted between a second high pressure inlet, for example as depicted in the FIGURE, a pipe 13, and the pump bearing 14.

In the fuel supply economizing mode, the high pressure fuel supply delivery is reduced from a nominal value to a reduced value determined by the geometry of the orifice plates 17 and 18, because the pump bearing 14 now receives only the fuel coming from the first fuel inlet 20 through the orifice plate 18. Since, in the reduced-delivery mode, the pipe 13 is no longer connected to the high pressure pump delivery pressure, but is connected only to the low pressure pump delivery pressure, the bearing 14 no longer receives the high pressure through the orifice plate 17. A nonreturn valve 16 inserted between the bearing 14 and the low pressure side of the controllable valve 12 prevents direct passage from the high pressure side to the low pressure side in the configuration in which the pipe 13 is supplied with a low pressure.

It should be pointed out that if it is intended for the bearing 14 to receive only the low pressure, all that is required is for the bearing to be supplied solely by connecting to the pipe 13. Because of the way in which the economizing valve 12 works, when the command 15 to close has been received, the pressure in this pipe 13 is the low pressure $P_l$.

In addition, as mentioned above, in order to increase the delivery supplied by the pump 3, for a given rotational speed of this pump, the pressurization pressure of the fuel directed through the pipe 11 toward the engine fuel injectors is lowered. This is achieved by mechanically changing the pressurization law for this valve.

In the normal mode of operation of the engine, the pressurizing valve 10 receives, on one 23 of its inlets, the high pressure represented by the arrow 26. The valve 10 receives a reduced high pressure on another inlet 24. In the example depicted in the FIGURE, the high pressure is reduced in a way known per se by passing through two orifice plates 19, 22 arranged in series. The first orifice plate 19 receives the high pressure from the pipe 20. The fuel leaving this first orifice plate is received on a second orifice plate 22 in communication with the low pressure $P_l$. The inlet 24 to the valve 10 is coupled to a joint 27 situated downstream of the first orifice plate 19 and upstream of the second 22. Thus, in the normal mode of operation, the pressurizing valve 10 operates in accordance with a first pressurizing law in which two pressures exert opposing forces. These are the high pressure represented by the arrow 26, applied to the inlet 23 of the valve 10, and the reduced high pressure present at the joint 27, which has a value of between the high pressure and the low pressure. In the embodiment depicted by way of example the FIGURE, this reduced high pressure is applied through the stop cock 4.

When a command 15 is received by the delivery economizing valve 12, the pipe 13 is placed in communication with the low pressure $P_l$. In consequence, the pressure between the orifice plates 19 and 22 and at the inlet 24 to the pressurizing valve 10 is also at the pressure $P_l$. If the high pressure embodied by the arrow 26 is still applied to the inlet 23 of the pressurizing valve 10, the valve 10 follows a second pressurizing law in which a given high pressure value results in a higher delivery directed through the outlet 11 of the valve 10 toward the engine fuel injectors.

Thus, the pressurizing valve 10 used in accordance with this embodiment of the invention operates according to a first or a second pressurization law.

The first law corresponds to the normal and customary engine operating speeds. The second law is used in the configuration of re-ignition of the engine in-flight, particularly if the rotational speed of the engine drops below a predetermined threshold. The pressure resulting from the pressure regulation carried out according to this second law is lower than the one which would have resulted from the regulation carried out according to the first law.

Comparing the pressures resulting from the first and second laws is meaningful only if these comparisons are carried out by calculation for a given rotational speed of the engine. When the pressurizing valve 10 operates in accordance with the second law, for a given rotational speed of the engine, the pressure of the fuel delivered to the engine fuel injectors is lower than when the valve 10 operates in accordance with the first law, and the delivery can therefore be higher.

What is claimed is:

1. In a fuel supply circuit of an aircraft engine including fuel injectors and a plurality of servovalves, a low pressure pump for raising the pressure of fuel from a tank from a pressure $P_f$ to a pressure $P_l$, and a high pressure pump for further raising the pressure of the fuel to a relatively high pressure, the high pressure fuel supplying said plurality of servovalves, and supplying said fuel injectors through a pressure regulator, a device connected downstream of said high pressure pump and upstream of said plurality of servovalves for controlling the supply of fuel from said high pressure pump to said plurality of servovalves, said device having an open position in which said high pressure pump is in communication with said plurality of servovalves and a closed position in which said plurality of servovalves is not supplied by said high pressure pump, said device receiving a command to move to said closed position in response to the pressure of said fuel dropping below a predetermined value or in response to the rotational speed of said engine dropping below a predetermined value.

2. A fuel supply circuit according to claim 1 in which said high pressure pump includes bearings, said bearings being supplied with high pressure fuel from said high pressure pump, said circuit further including means for reducing the value of the pressure at which said fuel is supplied to said bearings.

3. A fuel supply circuit according to claim 1 or claim 2, in which said pressure regulator operates according to a first or a second pressurization law, said second law being used when the engine speed is below a predetermined value, the pressure of fuel delivered to said fuel injectors as a result of said second law being lower than the pressure which would have resulted from said first law for the same rotational speed of the engine.

4. A fuel supply circuit according to claim 3, wherein said second pressurization law is obtained by virtue of means that modify the value of a fuel pressure applied to an inlet of said pressure regulator.

5. A fuel supply circuit according to claim 4, wherein said means modifying the value of a fuel pressure applied to an inlet of said pressure regulator comprises said device for controlling the supply of fuel from said high pressure pump, a low pressure present on one outlet of said device being directed toward said inlet of said pressure regulator.

6. In a fuel supply circuit of an aircraft engine including fuel injectors and a plurality of servovalves, a low pressure pump for raising the pressure of fuel from a tank from a pressure $P_f$ to a pressure $P_l$, and a high pressure pump for further raising the pressure of the fuel to a relatively high pressure, the high pressure fuel supplying said plurality of servovalves, and supplying said fuel injectors through a pressure regulator, a controllable fuel delivery economizing valve having an inlet and an outlet; said inlet being connected to receive the high pressure fuel from the high pressure pump; said outlet being connected to some of said plurality of servovalves for the delivery of said high pressure fuel to said servovalves, said economizing valve being movable, on receipt of a command, to shut off said input, thereby cutting off the delivery of said high pressure to said fuel servovales.

7. A fuel supply circuit according to claim 6, wherein said outlet of said economizing valve is coupled in series to a first orifice plate and to a second orifice plate, and wherein an inlet of the said pressure regulator is coupled to an outlet of said first orifice plate.

8. A fuel supply circuit according to claim 6 or claim 7, wherein said high pressure pump includes bearings, said bearings being supplied with high pressure fuel from said high pressure pump and being coupled to said outlet of said economizing valve.

9. A fuel supply circuit according to claim 8, wherein said bearings of the high pressure pump are also coupled to a high pressure inlet.

10. A fuel supply circuit according to claim 8, wherein said bearings of the high pressure pump are also coupled to a high pressure inlet via an orifice plate.

* * * * *